US012656293B2

(12) United States Patent
Lorenz Marckmann et al.

(10) Patent No.: US 12,656,293 B2
(45) Date of Patent: Jun. 16, 2026

(54) DIFFUSION CONTROL LAYER FOR USE IN ELECTROCHEMICAL SENSORS

(71) Applicant: Medtronic, Inc., Minneapolis, MN (US)

(72) Inventors: Jennifer Lorenz Marckmann, Scottsdale, AZ (US); Mohsen Askarinya, Chandler, AZ (US); David L. Probst, Chandler, AZ (US); John E. Burnes, Blaine, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 17/382,151

(22) Filed: Jul. 21, 2021

(65) Prior Publication Data

US 2022/0026386 A1 Jan. 27, 2022

Related U.S. Application Data

(60) Provisional application No. 63/054,668, filed on Jul. 21, 2020.

(51) Int. Cl.
*G01N 27/327* (2006.01)
*G01N 27/30* (2006.01)
*G01N 27/31* (2006.01)

(52) U.S. Cl.
CPC ....... *G01N 27/3275* (2013.01); *G01N 27/301* (2013.01); *G01N 27/31* (2013.01); *G01N 27/3271* (2013.01)

(58) Field of Classification Search
CPC .. G01N 27/3275; G01N 27/301; G01N 27/31; G01N 27/3271; G01N 33/492; G01N 27/3272; A61B 5/1451; A61B 5/14546; A61B 5/1473; A61B 5/14865;
(Continued)

(56) References Cited

U.S. PATENT DOCUMENTS

| | | | |
|---|---|---|---|
| 7,577,470 B2 | 8/2009 | Shah et al. | |
| 7,985,386 B2 | 7/2011 | Santini, Jr. et al. | |
| 8,060,174 B2 | 11/2011 | Simpson et al. | |

(Continued)

FOREIGN PATENT DOCUMENTS

| | | | | |
|---|---|---|---|---|
| WO | WO-2012158202 A2 * | 11/2012 | ........... | A61B 5/1473 |
| WO | 2019005301 A1 | 1/2019 | | |
| WO | 2019178588 A1 | 9/2019 | | |

OTHER PUBLICATIONS

Montiel et al., Delayed sensor activation based on transient coatings: biofouling protection in complex biofluids, JACS, 2018, 140, 14050-14053 (Year: 2018).*

(Continued)

*Primary Examiner* — Shizhi Qian
(74) *Attorney, Agent, or Firm* — Shumaker & Sieffert, P.A.

(57) ABSTRACT

An electrochemical sensor may include a common reference electrode, at least one counter electrode, and a work electrode platform including a work electrode and at least one diffusion control layer. The work electrode may be electrically coupled to the common reference electrode. The electrode may include a reagent substrate configured to react with an analyte to produce a signal indicative of a concentration of the analyte. The at least one diffusion control layer may be configured to control the diffusion of the analyte to the work electrode.

15 Claims, 6 Drawing Sheets

(58) Field of Classification Search
CPC .......... A61B 2503/42; A61B 2562/125; A61B 5/14532; C12Q 1/006

See application file for complete search history.

(56) References Cited

U.S. PATENT DOCUMENTS

| | | | | |
|---|---|---|---|---|
| 8,095,197 | B2 | 1/2012 | Santini, Jr. et al. | |
| 8,764,681 | B2 | 7/2014 | Aria et al. | |
| 8,914,090 | B2 | 12/2014 | Jain et al. | |
| 9,320,465 | B2 | 4/2016 | Kline | |
| 9,357,951 | B2 | 6/2016 | Simpson et al. | |
| 9,541,519 | B2 | 1/2017 | Shah et al. | |
| 9,566,026 | B2 | 2/2017 | Boock et al. | |
| 9,642,568 | B2 | 5/2017 | Shah et al. | |
| 10,006,910 | B2 | 6/2018 | Hoffman | |
| 10,321,864 | B2 | 6/2019 | Zhu | |
| 10,368,788 | B2 | 8/2019 | Scherer et al. | |
| 10,852,268 | B2 | 12/2020 | Hahn et al. | |
| 2006/0036145 | A1* | 2/2006 | Brister | A61B 5/6849 600/345 |
| 2009/0069658 | A1* | 3/2009 | Say | A61B 5/14546 600/347 |
| 2009/0076356 | A1* | 3/2009 | Simpson | A61B 5/14532 600/347 |
| 2010/0331644 | A1* | 12/2010 | Neale | A61N 1/05 600/345 |
| 2013/0023059 | A1* | 1/2013 | Hataoka | C07K 17/14 436/501 |
| 2013/0053665 | A1* | 2/2013 | Hughes | A61B 5/14865 600/347 |
| 2017/0020402 | A1 | 1/2017 | Rogers et al. | |
| 2017/0188916 | A1* | 7/2017 | Wang | C12N 11/08 |
| 2017/0191955 | A1* | 7/2017 | Zou | A61B 5/1486 |
| 2017/0311858 | A1 | 11/2017 | Yang et al. | |
| 2018/0160985 | A1* | 6/2018 | Willis | A61B 5/7253 |
| 2020/0054983 | A1 | 2/2020 | Jonnavittula et al. | |
| 2020/0069226 | A1 | 3/2020 | Hahn et al. | |
| 2020/0069227 | A1* | 3/2020 | Lieb | A61B 5/0031 |
| 2020/0072782 | A1 | 3/2020 | Hanh et al. | |
| 2020/0178801 | A1* | 6/2020 | Nazari | A61B 5/1473 |
| 2021/0063334 | A1* | 3/2021 | LaBelle | G01N 33/543 |
| 2021/0162369 | A1* | 6/2021 | Jeong | B01J 20/3085 |

OTHER PUBLICATIONS

Invitation to Pay Additional Fees and, Where Applicable, Protest Fee from International Application No. PCT/US2021 /042600, dated Oct. 29, 2021, 15 pp.

International Search Report and Written Opinion of International Application No. PCT/US2021/042600, dated Dec. 20, 2021, 19 pp.

Mujeeb-U-Rahman et al., "A Novel Semiconductor Based Wireless Electrochemical Sensing Platform for Chronic Disease Management," Biosensors and Bioelectronics, vol. 124-125, Jan. 15, 2019, pp. 66-74.

Kook et al., "Wafer-Scale Multilayer Fabrication for Silk Fibroin-Based Microelectronics," ACS Applied Materials and Interfaces, vol. 11, No. 1, Jan. 9, 2019 pp. 115-124.

International Preliminary Report on Patentability from International Application No. PCT/US2021/042600 dated Feb. 2, 2023, 12 pp.

Communication pursuant to Rule 164(2)(b) and Article 94(3) EPC from counterpart European Application No. 21752462.8 dated Jul. 7, 2025, 16 pp.

Li et al., "Nanoporous gold induced vertically standing 2D NiCo bimetal-organic framework nanosheets for non-enzymatic glucose biosensing", vol. 281, Elsevier B.V., Oct. 30, 2018, pp. 652-658.

Yuan et al., "Eliminating the Interference of Ascorbic Acid and Uric Acid to the Amperometric Glucose Biosensor by Cation Exchangers Membrane and Size Exclusion Membrane", Electroanalysis, vol. 17, No. 24, Wiley-VCH Verlag GmbH & Co. KGaA, Aug. 4, 2005, pp. 2239-2245.

* cited by examiner

166

170

172

174

176

PROVIDE DIELECTRIC SUBSTRATE DEFINING FIRST MAJOR SURFACE — 210

DEPOSIT INTERCONNECT LAYER ON AT LEAST A PORTION OF THE FIRST MAJOR SURFACE TO DEFINE A SECOND MAJOR SURFACE — 212

DEPOSIT A PLURALITY OF WORK ELECTRODES ON AT LEAST A PORTION OF THE SECOND MAJOR SURFACE — 214

DEPOSIT DIFFUSION CONTROL LAYER ON AT LEAST A PORTION OF THE PLURALITY OF WORK ELECTRODES — 216

DIFFUSION CONTROL LAYER FOR USE IN ELECTROCHEMICAL SENSORS

This application claims the benefit of U.S. Provisional Patent Application No. 63/054,668, filed 21 Jul. 2020, the entire contents of which is incorporated herein by reference.

FIELD

The present technology is related generally to methods and devices for measuring an analyte present in a biological system.

BACKGROUND

Laboratory tests are often used to measure analyte concentrations in fluids, such as fluids in a biological system. For example, a basic metabolic panel (BMP) is a typical lab test that includes three types of serum markers measuring seven analyte concentrations: an electrolyte panel that includes measurement of the concentrations of sodium, chloride, potassium, and bicarbonate/carbon dioxide; a renal function test that includes measurement of the concentration of blood urea nitrogen ("BUN") and creatinine; and a blood glucose test that includes measurement of the concentration of glucose. Other laboratory tests may be used to measure different analytes. A typical BMP, or other lab laboratory test, requires a biological sample, e.g., blood, be taken from a patient and analyzed by bench top and/or clinical equipment to determine analyte concentrations.

SUMMARY

A medical device may include an electrochemical sensor including a common reference electrode, at least one counter electrode, a work electrode platform, processing circuitry, an antenna, and a power source. The work electrode platform may include one or more work electrodes and at least one diffusion control layer. The medical device may be insertable into a biological system, such as insertable transcutaneously into the interstitial fluid of a human patient. Each respective diffusion control layer may control the diffusion of a corresponding analyte in the interstitial fluid of the human patient. Each respective work electrode of the one or more work electrodes may produce a corresponding signal indicative of a concentration of the corresponding analyte in the biological system. The processing circuitry may retrieve, identify, and process signals from a work electrode to determine the concentration of a corresponding analyte. In this way, the medical device may enable continuous or near continuous monitoring of the multiple analyte concentrations in a biological system. By using a common reference electrode and, optionally, one or more counter electrodes that are shared among two or more respective work electrodes, the size of the medical device may be reduced. By using one or more diffusion control layers, the diffusion of various analytes in the biological system may be separately controlled, allowing sensing the various analytes via a single work electrode and/or allowing for longer device electrochemical sensing longevity.

In some examples, the disclosure describes an electrochemical sensor that includes a common reference electrode, at least one counter electrode, and a work electrode platform including a work electrode and at least one diffusion control layer. The work electrode may be electrically coupled to the common reference electrode and may include a reagent substrate configured to react with an analyte to produce a signal indicative of a concentration of the analyte. The at least one diffusion control layer may be configured to control the diffusion of the analyte to the reagent substrate.

In some examples, the disclosure describes a method of forming an electrochemical sensor that includes forming a common reference electrode and at least one counter electrode. The method also includes forming a work electrode platform including a work electrode and at least one diffusion control layer. The work electrode may be electrically coupled to the common reference electrode. The work electrode includes a reagent substrate configured to react with an analyte to produce a signal indicative of a concentration of the analyte. The at least one diffusion control layer is configured to control the diffusion of the analyte to the work electrode.

This summary is intended to provide an overview of the subject matter described in this disclosure. It is not intended to provide an exclusive or exhaustive explanation of the techniques as described in detail within the accompanying drawings and description below. Further details of one or more examples are set forth in the accompanying drawings and the description below. Other features, objects, and advantages will be apparent from the description and drawings, and from the statements provided below.

Figures 1A, 1B:
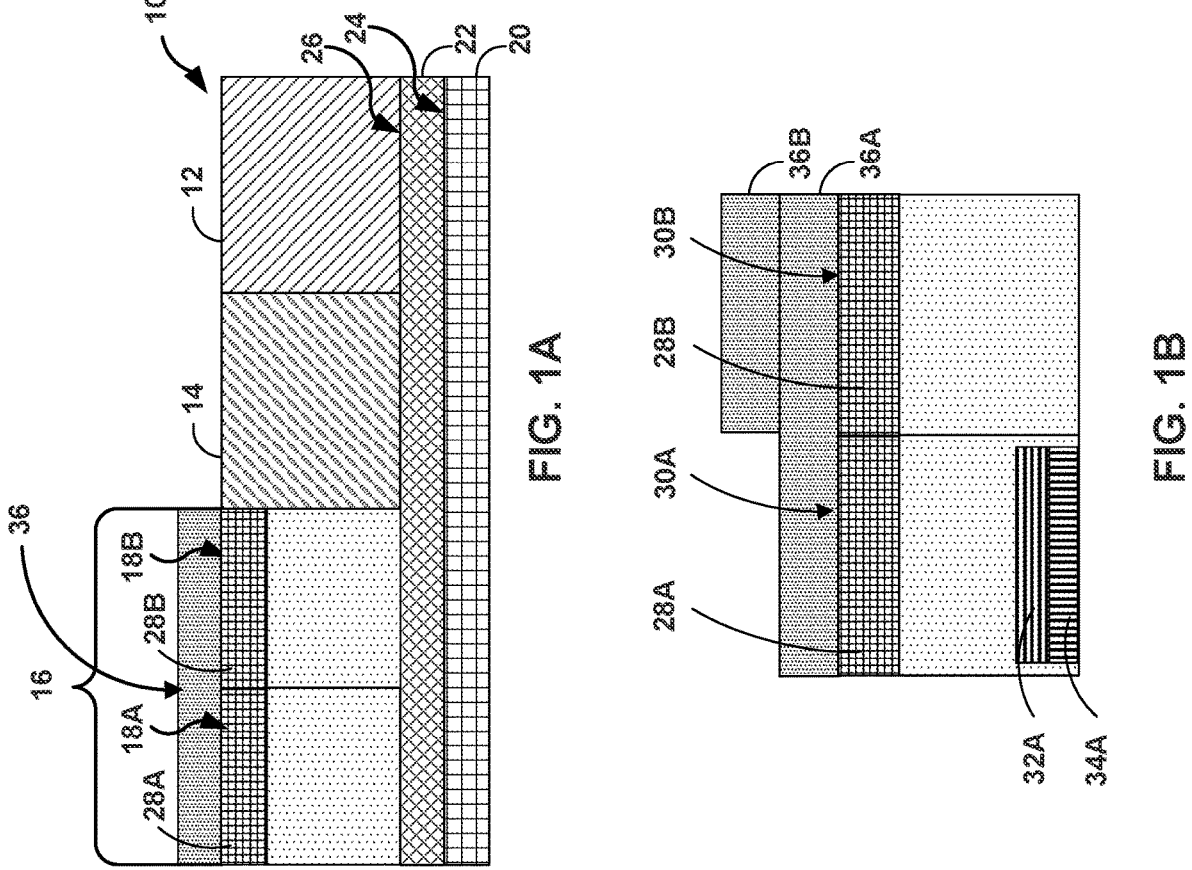
FIG. 1A is a schematic and conceptual diagram illustrating a cross-sectional side view of an example electrochemical sensor including a counter electrode, a common reference electrode, and a work platform having a plurality of work electrodes and a diffusion control layer.
FIG. 1B is a schematic and conceptual diagram illustrating a cross-sectional side view of an example configuration of a plurality of work electrodes and a plurality of diffusion control layers.

The details of one or more examples of this disclosure are set forth in the accompanying drawings and the description below. Other features, objects, and advantages of this disclosure will be apparent from the description and drawings, and from the claims.

DETAILED DESCRIPTION

A medical device may include an electrochemical sensor, processing circuitry, an antenna, and a power source, such as, for example, described in commonly assigned U.S. patent application Ser. No. 16/116,306, entitled "Electrochemical Sensor Including Multiple Work Electrodes and Common Reference Electrode," filed on Aug. 29, 2018, which is incorporated by reference herein. The electrochemical sensor may include a common reference electrode, at least one counter electrode, and a work electrode platform having one or more work electrodes and at least one diffusion control layer. In some examples, the common reference electrode and the at least one counter electrode may be operatively coupled to each work electrode of the one or more work electrodes. Using a single, common reference electrode and, in some examples, a single counter electrode may reduce the size of the electrochemical sensor. Each respective work electrode of the one or more of respective work electrodes may include a respective reagent substrate configured to react with a respective analyte, e.g., an analyte present in a sample fluid to which the one or more work electrodes are exposed.

A key challenge for the reaction of an implanted electrochemical sensor is that the respective reagent substrate will eventually be consumed, limiting how long it will remain active. Wafer fabrication techniques allow for the application of multiple material layers on top of each other. These layers can include insulative properties, conductive properties, and electrochemical sensing properties. In some examples, wafer fabrication techniques may be used to construct an electrochemical sensor having one or more diffusion control layers, allowing sensing various analytes using a single work electrode and providing a longer device electrochemical sensing longevity.

In some examples, a diffusion control layer may be used to control the diffusion of a respective analyte to a respective reagent substrate, e.g., by selecting the respective analyte present in a sample fluid or controlling the exposure time of the reagent substrate to the respective analyte. In this way, the diffusion control layer may selectively separate the respective analyte present in the sample or expose the reagent substrate to the respective analyte at a selected time.

In some examples, a reaction of the respective analyte with the respective reagent substrate, e.g., an oxidation reaction or a reduction reaction, may produce, or at least partially cause the generation of, a signal indicative of a concentration of the respective analyte. In some examples, an interaction of the respective analyte with the respective reagent substrate, e.g., at the double layer, may produce, or at least partially cause the generation of, a signal indicative of a concentration of the respective analyte. In some examples, the signal may include an electrical signal resulting from a change in current, potential, or impedance at the respective work electrode. In this way, the plurality of respective work electrodes may produce respective signals indicative of respective analytes.

The medical device also may include processing circuitry operatively coupled to the electrochemical sensor. The processing circuitry may be configured to receive from the electrochemical sensor the plurality of signals indicative of respective analytes. The processing circuitry may identify a respective signal of the plurality of signals corresponding to a respective selected work electrode of the plurality of respective work electrodes. The processing circuitry may process the identified signal to determine the concentration of the respective analyte associated with the respective selected work electrode. In this way, the processing circuitry may retrieve, identify, and process respective signals of the plurality of signals to determine the respective concentrations of respective analytes.

In some examples, the medical device may be configured to be inserted into a biological system, such as the interstitial fluid of a human patient. For example, the electrochemical sensor and processing circuitry may include biocompatible materials transcutaneously insertable into the interstitial fluid of a human patient. Each of the processing circuitry, common reference electrode, counter electrode, and work electrode platform may be layered or stacked inside a housing to reduce the size of the medical device. The medical device may include a power source operatively coupled to the processing circuitry to enable the medical device to operate completely within the biological system. The medical device may include an antenna operatively coupled to the processing circuitry to enable the medical device to communicate to an external device, e.g., while operating completely within a biological system. In this way, the medical device may enable continuous monitoring of the multiple analyte concentrations in a biological system.

FIG. 1A is a schematic and conceptual diagram illustrating a cross-sectional side view of an example electrochemical sensor 10 including at least one counter electrode 12, a common reference electrode 14, and a work platform 16 including work electrodes 18A, 18B (collectively, "work electrodes 18") and a diffusion control layer 36. In some examples, work platform 16 may include one or more diffusion control layers 36. For example, work platform 16 may include only diffusion control layer 36 or more than one diffusion control layer 36, such as two diffusion control layers 36, four diffusion control layers 36, six diffusion control layers 36, or more. In some examples, electrochemical sensor 10 includes fewer or more electrodes. For example, electrochemical sensor 10 may include only counter electrode 12 and work platform 16, only common reference electrode 14 and work platform 16, more than one counter electrode 12, more than one reference electrode 14, or more than five work electrodes 18, such as seven work electrodes 18, ten work electrodes 18, or more.

In the example illustrated in FIG. 1A, electrochemical sensor 10 includes a dielectric substrate layer 20 defining a first major surface 24. In some examples, dielectric substrate layer 20 may include a biocompatible polymer, such as polyamide or polyimide, liquid crystal polymer, silica glass, such as a glass wafer, sapphire, such as a sapphire wafer, or silicon. In some examples, first major surface 24 is substantially planar. In other examples, first major surface 24 may include surface features, such as ridges, valleys, or apertures, corresponding to features such as electrical traces or through vias. Surface features on or in first major surface 24 may be formed by any suitable means, such as, for example, machining, laser etching, chemical etching, or semiconductor manufacturing techniques such as front-end-of-line (FEOL) processes. In this way, dielectric substrate layer 20 may be formed to support additional layers, facilitate manufacture of the electrochemical sensor 10, or both.

An interconnect layer 22 is on first major surface 24 of dielectric layer 20. Interconnect layer 22 includes an electrically conductive material, such as, for example, aluminum, cadmium, chromium, copper, gold, nickel, platinum, titanium, indium nitride, indium phosphide, zinc oxide, alloys thereof, or the like. In some examples, first major surface 24 may be metallized by, for example, chemical vapor deposition, physical vapor deposition, thermal spraying, cold spraying, or the like, to form interconnect layer 22. Interconnect layer 22 defines a second major surface 26 opposite first major surface 24. Counter electrode 12, common reference electrode 14, and work platform 16 may be disposed on second major surface 26 to electrically couple each respective work electrode of work electrodes 18 to one or both of counter electrode 12 and common reference electrode 14. In some examples, interconnect layer 22 may be operatively coupled to a computing device, such as processing circuitry, to facilitate transmission of a signal from a respective work electrode of work electrodes 18 to the computing device. In some examples, interconnect layer 22 may form a plurality of electrical traces, e.g., formed using semiconductor manufacturing techniques such as back-end-of-line (BEOL) processes. A respective electrical trace or the plurality of electrical traces may electrically couple a respective work electrode of work electrodes 18 to one or more of a computing device, counter electrode 12, or common reference electrode 14.

Electrochemical sensor 10 is configured to detect the concentration of each of a plurality of analytes present in a sample fluid. In some examples, the sample fluid may include a biological fluid, such as blood, interstitial fluid, saliva, urine, spinal fluid, peritoneal fluid, or the like. In some examples, the plurality of analytes include, but are not limited to, one or more of sodium, chloride, potassium, bicarbonate/carbon dioxide, blood urea nitrogen ("BUN"), creatinine, glucose, brain natriuretic peptide (BNP), C-reactive protein (CRP), troponin I (cTnI), lactate, pH, L-dopa, and the like. Each respective work electrode of work electrodes 18 and, in some examples, counter electrode 12 and/or common reference electrode 14, may be fluidly coupled to the sample fluid. In this way, electrochemical sensor 10 may enable continuous or near continuous monitoring of the multiple analyte concentrations in the sample fluid. By using a common reference electrode and, optionally, one or more counter electrodes that are shared among two or more respective work electrodes, a size of electrochemical sensor 10 may be reduced.

Counter electrode 12 (e.g., auxiliary cell) may be disposed on interconnect layer 22. Counter electrode 12 may be configured to function as a cathode when a respective work electrode of work electrodes 18 is operating as an anode or vice versa. In some examples, counter electrode 12 may include an electrochemically inert material, such as copper, gold, indium tin oxide, platinum, silver, silver/silver chloride, titanium, tungsten, tantalum, alloys thereof, carbon, or conductive nanoparticles embedded within a polymeric material. Counter electrode 12 may include any suitable shape, such as rectilinear or curvilinear. In some examples, counter electrode 12 may define a rectangular shape. In some examples, a length of counter electrode 12 is between approximately 0.2 millimeters and approximately 1 centimeter, such as approximately 8.5 millimeters. In some examples, a width of counter electrode 12 is between approximately 0.2 millimeters and approximately 1 centimeter, such as approximately 8.5 millimeters. In some examples, counter electrode 12 may include a surface area larger than each respective work electrode of work electrodes 18. For example, counter electrode 12 may include a surface area that is approximately two to one hundred times the surface area of each respective work electrode of work electrodes 18. In some examples, the larger surface area of counter electrode 12 relative to work electrodes 18 may ensure that a half-reaction occurring at counter electrode 12 may occur fast enough so as not to limit the reactions at work electrodes 18.

In some examples, counter electrode 12 and a respective work electrode of work electrodes 18 may be configured to form a circuit over which current is either applied or measured. The potential of counter electrode 12 may be adjusted to balance a respective reaction occurring at a respective work electrode of work electrodes 18. In this way, the potential of the respective work electrode of work electrodes 18 may be measured against common reference electrode 14 without passing current over common reference electrode 14, which may compromise the stability of common reference electrode 14. In some examples, counter electrode 12 may be separated from work electrodes 18 by, for example, a dielectric barrier and/or orientation of work electrodes 18 with respect to counter electrode 12, to reduce byproducts generated at counter electrode 12 from contaminating the sample fluid. For example, if a reduction reaction is being performed at a respective work electrode of work electrodes 18, oxygen may be evolved from counter electrode 12.

Common reference electrode 14 may be configured to provide a stable and known electrode potential. In some examples, common reference electrode 14 may provide a stable potential by using a redox based system. For example, common reference electrode 14 may include a silver/silver chloride electrode having a potential of about 0.197 volts versus a saturated calomel electrode (SCE). Common reference electrode 14 including other materials may have a different stable and known electrode potential. In some examples, common reference electrode 14 may include gold, platinum, silver/silver chloride, hydrogen electrode, copper sulfate, or palladium. Common reference electrode 14 may include any suitable shape, such as rectilinear or curvilinear. In some examples, common reference electrode 14 may define a rectangular shape. In some examples, a length of common reference electrode 14 is between approximately 0.2 millimeters and approximately 1 centimeter, such as approximately 8.5 millimeters. In some examples, a width of common reference electrode 14 is between approximately 0.2 millimeters and approximately 1 centimeter, such as approximately 8.5 millimeters. In some examples, electrochemical sensor 10 may use an external driving voltage. In examples in which a driving voltage is applied to a respective work electrode of work electrodes 18, common reference electrode 14 may stabilize the driving voltage at the respective work electrode of work electrodes 18.

Each respective work electrode of work electrodes 18 may include a selected chemistry. For example, each respective work electrode of work electrodes 18 includes a respective reagent substrate disposed on second major surface 26. In some examples, a reaction of a respective analyte with a corresponding respective reagent substrate may cause electron transfer between a respective work electrode of work electrodes 18 and interconnect layer 22 (e.g., producing a current). In some examples, a reaction of a respective analyte with a corresponding respective reagent substrate may contribute to the potential in a respective work electrode of work electrodes 18 (e.g., producing a voltage). In some examples, interaction of a respective analyte with a corresponding respective reagent substrate may contribute to the resistivity of a respective work electrode of work electrodes 18 (e.g., changing an impedance of the respective work electrode of work electrodes 18 at the double layer). In this way, electrochemical sensor 10 may produce a current, a potential, or an impedance that may be processed by, for example, processing circuitry operatively coupled to each respective work electrode of work electrodes 18, and which allows detection of an analyte.

Each respective work electrode of work electrodes 18 may include any suitable shape, such as rectilinear or curvilinear. In some examples, each work electrode of work electrodes 18 may define a rectangular shape. In some examples, a length of each respective work electrode of work electrodes 18 is between approximately 0.1 millimeters and approximately 2.5 millimeters, such as approximately 0.5 millimeters. In some examples, a width of each respective work electrode of work electrodes 18 is between approximately 0.1 millimeters and approximately 2.5 millimeter, such as approximately 0.5 millimeters.

Each respective work electrode of work electrodes 18 may include one or more layers of materials to enable the respective work electrode of work electrodes 18 to produce a signal in response to the presence of a respective selected analyte. FIG. 1B is a schematic and conceptual diagram illustrating a cross-sectional side view of an example configuration of a plurality of work electrodes 18 and a plurality of diffusion control layers 36. As illustrated in FIG. 1B, each respective work electrode of work electrodes 18 may include a respective reagent substrate 28A, 28B (collectively, "reagent substrates 28") configured to react with a respective analyte or a derivative thereof. For example, work electrode 18A may include reagent substrate 28A. In some examples, a respective analyte may interact with a surface 30A of a respective reagent substrate 28A. For example, the respective analyte may transfer electrons to surface 30A or remove electrons from surface 30A. In some examples, a respective work electrode of work electrodes 18 may include one or more conductive material layers. For example, work electrode 18A may include a first conductive layer 32A and a second conductive layer 34A. Example conductive material layers include, but are not limited to, gold, indium tin oxide, carbon, carbon paste, mesoporous carbon, carbon walled, platinum, shiny platinum, black platinum, polyimide silver, and silver/silver-chloride. In some examples, first conductive layer 32A may include a silver/silver-chloride material. In some examples, second conductive layer 34A may define a surface on which first conductive layer 32A may be disposed. First and second conductive material layers 32A and 34A may facilitate the transfer of electrons to or from interconnect layer 22.

In some examples, a respective reagent substrate of reagent substrates 28 includes a respective immobilization substrate configured to immobilize a respective reagent. In some examples, a respective reagent may include at least one enzyme, such as an oxidase enzyme. In some examples, a respective reagent may be immobilized on an immobilization substrate by, for example, physical entrapment (e.g., a respective reagent physically unable to pass through pores of the immobilization substrate), chemical bonding (e.g., ionic bonding, covalent bonding, van der Waals forces, and the like), or combinations thereof. In some examples, the immobilization substrate may include a polymer, such as polylysine, aminosilane, epoxysilane, or nitrocellulose, or a substrate having a three-dimensional lattice structure, such as a hydrogel, an organogel, or a xerogel. In some examples, the immobilization substrate may include a ligand configured to chemically bond to at least a portion of a respective reagent. For example, a respective immobilization substrate including glutaraldehyde may immobilize glucose oxidase. A respective immobilization substrate including primary amine conjugation enniatin may immobilize (used for sodium Na+ detection) can be immobilized to the working electrode through. In some examples, the immobilization substrate may include, but is not limited to, glutaraldehyde, thiol based conjugation compounds (e.g., 16-mercaptohexadecanoic acid (MHDA), diethyldithiocarbamic acid (DSH), dithiobissuccinimidylundecanoate (DSU), purine conjugation compounds, streptavidin-biotin conjugation compounds, a primary amine and a vinyl pyridine polymer, lysine, 1-ethyl-3-(3-dimethylaminopropyl)carbodiimide hydrochloride (EDC) and N-hydroxysuccinimide (NHS) coupling, agarose based gel and polymer mixtures, silane crosslinker, (hydroxyethyl)methacrylate, and poly(ethylene glycol) diacrylate polymer. By immobilizing a respective reagent, the immobilization substrate may reduce loss of the respective reagent to the sample fluid.

In some examples, a respective reagent of reagent substrates 28 may include at least one enzyme. The at least one enzyme may be selected based on the analyte to be detected with the respective work electrode of work electrodes 18. For example, the at least one enzyme may be selected from the group consisting of glucose oxidase (for detecting glucose), creatinine amidohydrolase (for detecting creatinine), creatine amidinohydrolase (for detecting creatine), sarcosine oxidase (for detecting sarcosine), carbonic anhydrase (for detecting bicarbonate and/or carbon dioxide), choline oxidase (for detecting choline), horseradish peroxidase (for detecting peroxide, oxygen, nitric oxide, biogenic amines, or the like), thiamine oxidase (for detecting thiamine), urease (for detecting urea), glycerol-3-phosphate oxidase (for detecting glycerol-3-phosphate), L-amino acid oxidase (for detecting L-amino acid, such as, e.g., L-alanine), lactate oxidase (for detecting lactate and/or lactic acid), catalase (for detecting hydrogen peroxide, e.g., produced by other enzymatic reactions), alkaline phosphatase (for detecting phosphate esters), alcohol oxidase (for detecting primary alcohols), D-amino acid oxidase (for detecting D-amino acids, such as, e.g., D-serine), cholesterol oxidase (for detecting cholesterol), pyridoxal oxidase (for detecting pyridoxal), NAD(P)H oxidase (for detecting NAD(P)H), and pyruvate oxidase (for detecting pyruvate), beta-hydroxybuterate dehydrogenase (for detecting ketones), or mixtures thereof. In some examples, the at least one enzyme may be selected to react with a selected analyte and provide a reaction pathway to enable detection of the concentration of the selected analyte.

In some examples, a respective reagent of reagent substrates 28 may include glucose oxidase (e.g., notatin), which may oxidize glucose in the sample fluid to produce D-glucono-S-lactone and hydrogen peroxide. The liberated hydrogen peroxide may be oxidized at, e.g., second major surface 26 or first conductive material layer 32A, to produce an electric current that is proportional to the glucose concentration in the sample fluid.

In some examples, a respective reagent of reagent substrates 28 may include creatinine amidohydrolase, which may hydrolyze creatinine in the sample fluid to produce creatine. The respective reagent substrate of reagent substrates 28 may also include creatine amidinohydrolase to hydrolyze creatine to form sarcosine. The respective reagent substrate of reagent substrates 28 may also include sarcosine oxidase to oxidize sarcosine to form hydrogen peroxide. The liberated hydrogen peroxide may be oxidized at, e.g., second major surface 26 or first conductive material layer 32A, to produce an electric current that is proportional to the creatinine concentration in the sample fluid.

In examples in which a respective reagent of reagent substrates 28 includes carbonic anhydrase, carbonic anhydrase may be coupled with p-benzoquinone to reduce dissolved carbon dioxide in the sample fluid to produce carbonic acid. The reduction reaction may produce an electric current that is proportional the bicarbonate concentration in the sample fluid.

In some examples, a respective reagent of reagent substrates 28 may include urease, which may hydrolyze urea to produce ammonium ions. The ammonium ions may produce a potential in a respective work electrode that is associated with the urea concentration, e.g., by the Nernst equation.

In some examples, work electrodes 18 may be coupled with one or more diffusion control layers. As illustrated in FIG. 1B, work electrodes 18 may be coupled with diffusion control layers 36A and 36B (collectively, "diffusion control layer 36") configured to expose a respective reagent substrate to a respective analyte at a selected time. Alternatively, each respective work electrode of work electrodes 18 may be coupled with one or more diffusion control layers configured to control the diffusion of a respective analyte in a sample fluid to a respective reagent substrate. In this way, the one or more diffusion control layers allows sensing one or more selected analytes using a single work electrode and/or improving the longevity of work electrodes 18 compared to work electrodes 18 not coupled with a diffusion control layer 36.

The one or more diffusion control layers 36 may include, for example, one or more dissolvable diffusion control layers, one or more enzyme-driven membranes, one or more permeable membranes, one or more layered reagent substrates, one or more metal-organic frameworks, one or more self-assembled monolayers, one or more pharmaceuticals, or combinations thereof, which are described in reference to FIGS. 1A-3. For example, as illustrated in FIGS. 1A and 1B, work electrode 18B may include reagent substrate 28B defining surface 30B. Diffusion control layer 36A may be on surface 30B, and diffusion control layer 36B may be on diffusion control layer 36A. Each diffusion control layer of diffusion control layers 36 may be configured to selectively separate a respective analyte present in a sample or expose a reagent substrate to the respective analyte at a selected time.

In some examples, the one or more diffusion control layers may include one or more dissolvable diffusion control layers configured to expose a respective reagent substrate to a respective analyte at a selected time. As illustrated in FIG. 1B, diffusion control layer 36 may include dissolvable diffusion control layers 36A and 36B formed of a biocompatible material that is selected to serve as insulation membranes to insulate one or more work electrodes from a sample fluid, such as serum, plasma, interstitial fluid, urine, gastric juice, or biological fluid. For example, dissolvable diffusion control layer 36A may include a first area configured to cover work electrode 18A, and dissolvable diffusion control layer 36B may include a second area configured to cover work electrode 18B.

Each of dissolvable diffusion control layer 36A and 36B may be soluble in a sample fluid in a selected amount of time or at a selected rate. After a selected period of time, e.g., based on a dissolution rate of the dissolvable diffusion control layer 36A and/or 36B, a previously unexposed work electrode may be exposed to the sample fluid, thereby exposing a respective reagent substrate to a respective analyte. For example, dissolvable diffusion control layer 36A may be dissolved at a first point in time to expose work electrode 18A to a respective analyte (e.g. a sample fluid including the respective analyte), while dissolvable diffusion control layer 36B may remain undissolved or may not be fully dissolved to isolate work electrode 18B from the respective analyte. Dissolvable diffusion control layer 36B may be dissolved at a second point in time, for example, after the first point in time, to expose work electrode 18B to the respective analyte. The duration between the first point in time and the second point in time may include any suitable duration. For example, the duration may be within minutes, hours, days, weeks, or months. In some examples, the duration may be based on a useable life of a respective work electrode (e.g., a respective reagent substrate).

Dissolvable diffusion control layer 36 may include any suitable material configured to dissolve in the sample fluid at a selected dissolution rate. In some examples, dissolvable diffusion control layer 36 may include carbon, carbon nanotubes, graphite, zinc, magnesium, natural hydrogels, synthetic hydrogels, or combinations thereof. The natural hydrogels may include one or more of collagen, gelatin, chitosan, agar, agarose, and fibrin. The synthetic hydrogels may include one or more of polyethylene glycol (PEG), polyethylene oxide (PEO), polyvinyl alcohol (PVA), propylene fumarate (PPF), and aldehyde guluronate groups. In some examples, the dissolution rate of dissolvable diffusion control layer 36 can be controlled by adjusting the composition of the dissolvable diffusion control layer. For example, a dissolvable diffusion control layer made of a material being relatively more electroactive with regard to glucose, such as magnesium, may dissolve faster in the interstitial fluid of a human patient than a dissolvable diffusion control layer made of a material being relatively less electroactive with regard to glucose, such as graphite.

Dissolvable diffusion control layer 36 may include any suitable thickness. In some examples, a thickness of dissolvable diffusion control layer 36 may be within a range from about 5 micrometers ($\mu$m) to about 150 $\mu$m, such as approximately 25 $\mu$m. In some examples, the dissolution time of dissolvable diffusion control layer 36 may be controlled by adjusting the thickness of the dissolvable diffusion control layer. For example, a relatively thick dissolvable diffusion control layer may dissolve over a longer time than a relatively thin dissolvable diffusion control layer. By using one or more dissolvable diffusion control layers 36, one or more work electrodes 18 may be exposed to a respective analyte at a selected time, thereby extending a lifespan of electrochemical sensor 10.

Figure 2:
FIG. 2 is a schematic and conceptual diagram illustrating a cross-sectional side view of an example configuration of a work electrode and a plurality of diffusion control layers.
Figure 2:
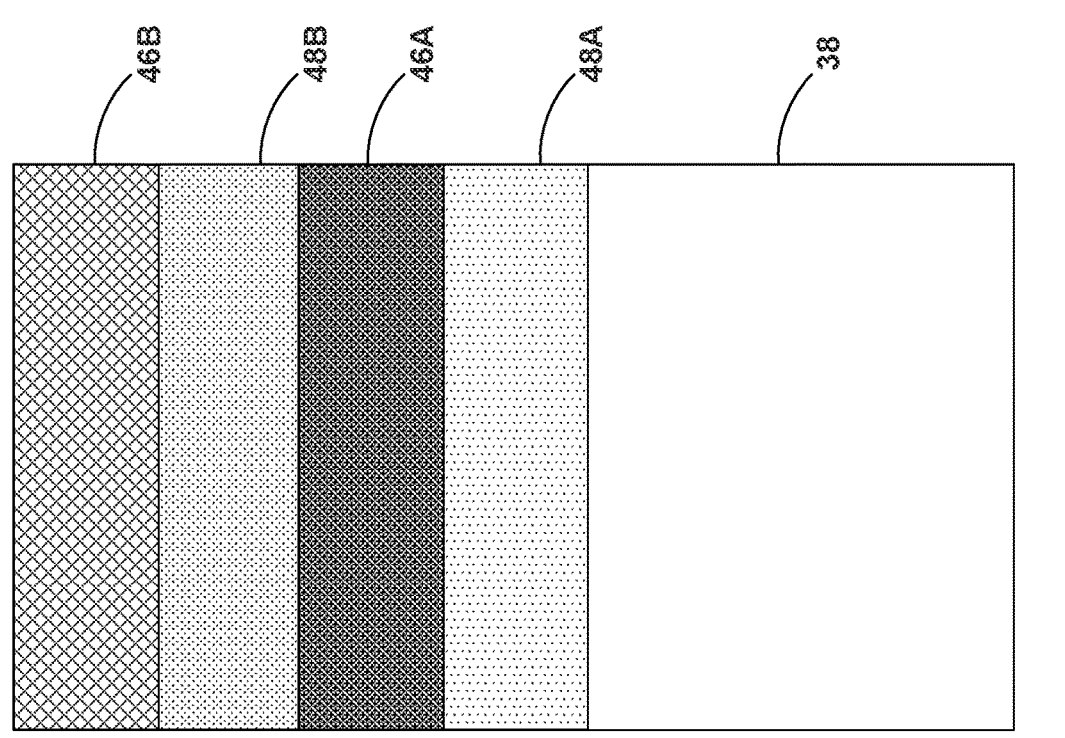

In some examples, the one or more diffusion control layers may be configured to control the diffusion of a respective analyte in a sample fluid to a respective reagent substrate. FIG. 2 is a schematic and conceptual diagram illustrating a cross-sectional side view of an example electrochemical sensor 40 including a work electrode and a plurality of diffusion control layers. Electrochemical sensor 40 may be the same as or substantially similar to electrochemical sensor 10 described above in reference to FIGS. 1A and 1B, except for the differences described herein. As illustrated in FIG. 2, a work electrode 38 may be coupled with diffusion control layers 46A and 46B (collectively, "diffusion control layers 46"). It will be understood by those skilled in the art that although the following description relates to an electrochemical sensor that includes diffusion control layers 46, the electrochemical sensor may be embodied with a greater or lesser number of diffusion control layers.

Each diffusion control layer of diffusion control layers 46 may be configured to control the diffusion of a respective analyte in a sample fluid to a respective reagent substrate of reagent substrates 48A and 48B (collectively, "reagent substrates 48"). For example, diffusion control layer 46A may be configured to control the diffusion of a first analyte to reagent substrate 48A, and diffusion control layer 46B may be configured to control the diffusion of a second analyte to reagent substrate 48B. As illustrated in FIG. 2, diffusion control layer 46A may be disposed on reagent substrate 48A, reagent substrate 48B may be disposed on diffusion control layer 46A, and diffusion control layer 46B may be disposed on reagent substrate 48B. Reagent substrate 48A may be configured to react with a first analyte (or a birproductd derived therefrom) to produce a first signal indicative of a concentration of the first analyte. Reagent substrate 48B may be configured to react with a second analyte different from the first analyte to produce a second signal indicative of a concentration of the second analyte.

In some examples, each diffusion control layer of diffusion control layers 46 may include one or more enzyme-driven membranes configured to control the diffusion of a respective analyte to a respective reagent substrate by enzymatic-analyte interaction. For example, each reagent substrate of reagent substrates 48 may include a respective enzyme, e.g., glucose oxidase (GOx), configured to react with a respective analyte in a sample fluid, and the one or more enzyme-driven membranes may be disposed on the respective reagent substrate to prevent the respective enzyme from leaching out. The one or more enzyme-driven membranes may be coated on the respective reagent substrate using various techniques, such as screen printing, inkjet printing, photolithography, dip coating, spray coating, spin coating, slot coating, or combinations thereof. In some examples, the one or more enzyme-driven membranes may be selected based on the respective enzyme in order to segregate a respective analyte from interfering chemical species in the sample fluid. In some examples, the one or more enzyme-driven membranes may include hydrogel and one or more additives. In some examples, the one or more additives may include dexamethasone, nitric oxide (NO) or combinations thereof.

In some examples, each diffusion control layer of diffusion control layers 46 may include one or more permeable membranes configured to control the diffusion of a respective analyte to a respective reagent substrate. In some examples, the one or more permeable membrane may include an impermeable material defining a plurality of pores. In some examples, the permeable membrane may be made of impermeable material, such as nylon, PET, PTFE, or combinations thereof. In some examples, the plurality of pores may be formed using physical techniques such as drilling, laser drilling, or combinations thereof. In some examples, the plurality of pores may be formed using chemical techniques such as etching. In some examples, the permeable membrane may be made of permeable material, such as cellulose fibers natural hydrogels, synthetic hydrogels, or combinations thereof. The natural hydrogels may include one or more of collagen, gelatin, chitosan, agar, agarose, and fibrin. The synthetic hydrogels may include one or more of polyethylene glycol (PEG), polyethylene oxide (PEO), polyvinyl alcohol (PVA), propylene fumarate (PPF), and aldehyde guluronate groups.

In some examples, the number of the plurality of pores and/or the average size of the plurality of pores may be selected to control the diffusion of a respective analyte to a respective substrate. In some examples, dissolution rates of diffusion control layers 46 may be controlled by adjusting the average diameter of the plurality of pores. For example, a permeable membrane having pores with a relatively large diameter may diffuse a respective analyte faster than a permeable membrane having pores with a relatively small diameter. In some examples, dissolution rates of diffusion control layers 46 may be controlled by adjusting the arrangement of the plurality of pores. For example, a permeable membrane having pores defining a relatively tortuous path may diffuse a respective analyte slower than a permeable membrane having pores defining a relatively straight path.

In some examples, the average size of the plurality of pores may be different on each diffusion control layer. For example, diffusion control layer 46A may include a first permeable membrane defining first pores having a first average diameter, and diffusion control layer 46B may include a second permeable membrane defining second pores having a second average diameter. In some examples, the first average diameter of the first pores in diffusion control layer 46A may be within a range from about 5 angstroms (Å) to about 200 Å, and the second average diameter of the second pores in diffusion control layer 46B may be within a range from about 5 Å to about 200 Å. As illustrated in FIG. 2, diffusion control layer 46B with a relatively large pore size is disposed closer to a sample fluid than diffusion control layer 46A with a relatively small pore size. In this way, diffusion control layer 46B may control the diffusion of a relatively large analyte to react with reagent substrate 48B, and diffusion control layer 46A may control the diffusion of a relatively small analyte to react with reagent substrate 48A.

Figure 3:
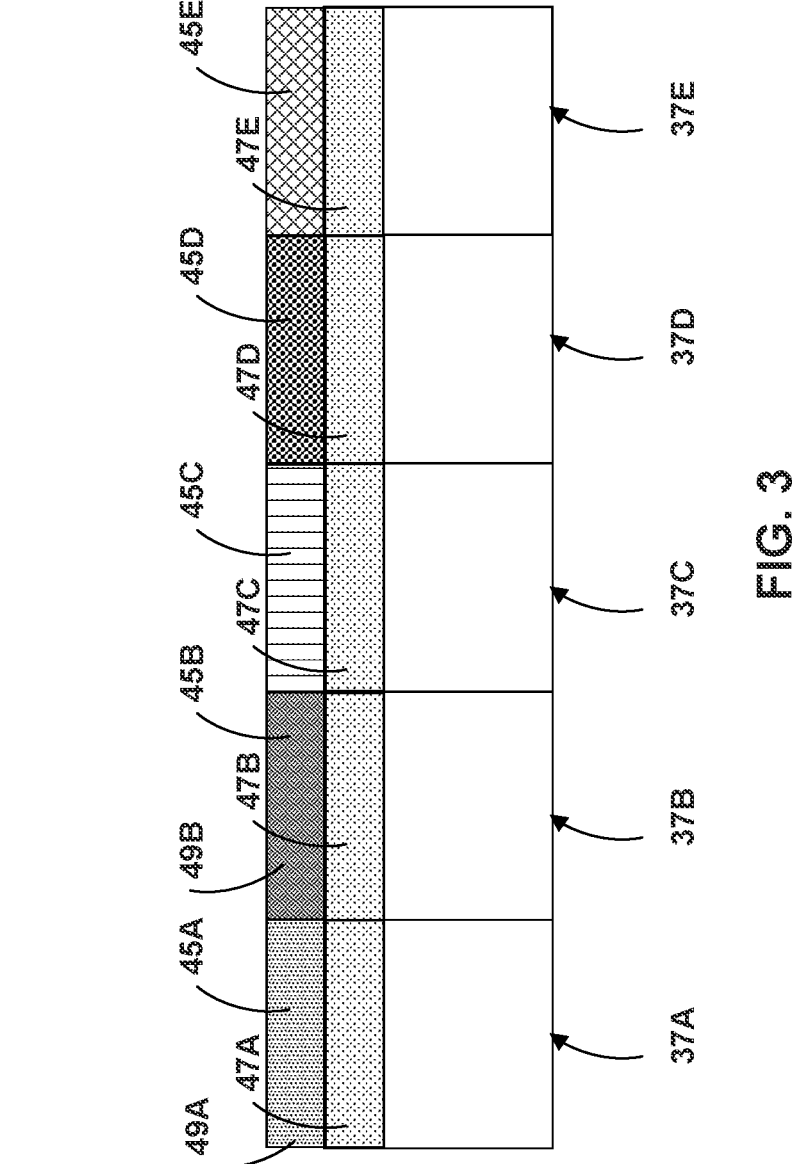
FIG. 3 is a schematic and conceptual diagram illustrating a cross-sectional side view of an example configuration of a plurality of work electrodes and a plurality of diffusion control layers.

In some examples, an electrochemical sensor may include a plurality of work electrodes and a plurality of diffusion control layers. FIG. 3 is a schematic and conceptual diagram illustrating a cross-sectional side view of an example electrochemical sensor 50 including work electrodes 37A, 37B, 37C, 37D and 37E (collectively, "work electrodes 37"), where respective diffusion control layers 45A, 45B, 45C, 45D and 45E (collectively, "diffusion control layers 45") coupled with respective work electrodes 37. Electrochemical sensor 50 may be the same as or substantially similar to any one or more of electrochemical sensor 10 described above in reference to FIGS. 1A and 1B and/or electrochemical sensor 40 described above in reference to FIG. 2, except for the differences described herein. As illustrated in FIG. 3, each respective work electrode of work electrodes 37 may include a respective reagent substrate 47A, 47B, 47C, 47D and 47E (collectively, "reagent substrates 47) configured to react with a respective analyte or a derivative thereof.

In some examples, a work electrode may include a first reagent substrate configured to react with a first analyte at a first potential applied to the first reagent substrate to produce a first signal indicative of a concentration of the first analyte, and a diffusion control layer may include a second reagent substrate configured to react with a second analyte at a second potential applied to the second reagent substrate to produce a second signal indicative of a concentration of the second analyte. As illustrated in FIG. 3, work electrode 37A and diffusion control layer 45A may include a respective reagent substrate 47A, 49A. In some examples, reagent substrate 47A may be configured to react with a first analyte at a first potential applied to work electrode 37A to produce a first signal indicative of a concentration of the first analyte, and reagent substrate 49A may be configured to react with a second analyte at a second potential applied to diffusion control layer 45A to produce a second signal indicative of a concentration of the second analyte.

In some examples, potentiometry may be used to measure the potential between two electrodes in a sample fluid. In examples using potentiometry, common reference electrode 14 may have a constant potential irrespective of the concentration of an analyte in the sample fluid. Work electrode 37A may demonstrate Nernstian response to the composition of the sample fluid. That is, a difference of potential between common reference electrode 14 and work electrodes 37A may be proportional to the concentration of the analyte in the sample fluid, e.g., the difference of potential may increase approximately 59 mV (e.g., for a one electron transfer reaction) or approximately 25 mV (e.g., for a two electron transfer reaction) for every order of magnitude increase in the concentration of the analyte in the sample fluid.

In some examples, work electrodes 37A may include a selective ion transport membrane. For example, the selective ion transport membrane may include an ionophore to control transport of a respective analyte work electrodes 37A. In some examples, the ionophore may control the transport of, for example, hydrogen ions ($H^+$), sodium ions ($Na^+$), potassium ions ($K^+$), chloride ions ($Cl^-$), calcium ions ($Ca^{2+}$), bicarbonate ($HCO_3^-$), and/or BUN. In this way, work electrodes 37A may convert the activity of a respective analyte in the sample fluid into an electrical potential.

The electrical potential may be measured by, for example, a voltmeter, such as a high output impedance amplifier. The measured voltage may be proportional to the ionic activity of the respective analyte according to the Nernst equation. For example, the Nernst equation relates the reduction potential of an electrochemical reaction (half-cell or full cell reaction) to the standard electrode potential, temperature, and activities (often approximated by concentrations) of the chemical species undergoing reduction and oxidation. In one example, the Nernst equation may be given by $E_{cell}=E°+ 2.3026(RT/zF) \log_{10}(Q_r)$, where $E_{cell}$ is the cell potential (electromotive force, emf) at the temperature of interest, E° is the standard cell potential (millivolts), R is the universal gas constant (Joules per kelvin-mole), T is the temperature (kelvin), z is the number of electrons transferred to the respective work electrode of work electrodes 37, F is Faraday's constant (coulombs per mole of electrons), and $Q_r$ is the reaction quotient of the cell reaction. The number of electrons transferred to the respective work electrode, z, may be proportional to the concentration of the analyte in the sample fluid. In this way, the measured potential may be associated with the concentration of the analyte in the sample fluid.

In some examples, a work electrode may include a first reagent substrate configured to generate a first impedance in response to a first potential in the presence of a first analyte to produce a first current frequency, and a diffusion control layer may include a second reagent substrate configured to generate a second impedance in response to a second potential in the presence of a second analyte to produce a second current frequency. In some examples, the first potential and the second potential may be the same potential or may include one or more differences, such as a sine wave perturbation within a range from about 1 mV to about 250 mV or about 5 mV to about 10 mV. As illustrated in FIG. 3, each of work electrode 37B and diffusion control layer 45B may include a respective reagent substrate 47B, 49B. In some examples, reagent substrate 47B may be configured to generate a first impedance in response to a first potential in presence of a first analyte to produce a first current frequency, and reagent substrate 49B may be configured to generate a second impedance in response to a second potential in presence of a second analyte to produce a second current frequency.

In some examples, electrochemical impedance spectrometry (EIS) may be used to determine an impedance of work electrode 37B in a sample fluid (e.g., the electrochemical system) in response to a potential applied to work electrode 37B. EIS is a perturbative characterization of the dynamics of an electrochemical process. A current frequency dependence of the impedance of work electrode 37B may be associated with the concentration of a respective analyte in the sample fluid. For example, a working potential may be applied to work electrode 37B, where the working potential may include a direct current polarization potential and a superimposed alternating current potential having a selected frequency (e.g., an excitation signal). The current response (e.g., a response signal) may be measured by, for example, an ammeter. The selected frequency may include a frequency predetermined to result in a response signal for a selected analyte (e.g., an optimal frequency for the selected analyte). Additionally, or alternatively, the selected frequency may include a plurality of frequencies applied sequentially, such as, for example, ranging from 1 Hz to 100 kHz (e.g., a frequency sweep). In some examples, the working potential may be selected to the dynamic noise for EIS. In examples in which the excitation signal is sufficiently small, e.g., between approximately 1 millivolts (mV) to 250 mV, the current response may be modeled as a linear electrochemical system.

When modeled as a linear electrochemical system, the impedance with respect to radial frequency, $Z(\omega)$, may be represented as a complex number (based on Euler's relationship $\exp(j\ \varphi)=\cos(\varphi)-j\ \sin(\varphi)$) as $Z(\omega)=Z_0(\cos(\varphi)-j\ \sin(\varphi))$, where Z is associated with the working potential, and p is the phase shift of the response signal. In some examples, the impedance $Z(\omega)$ may be used to produce a Nyquist plot (e.g., real part of the expression for $Z(\omega)$ plotted on the X-axis and the imaginary part of the expression for $Z(\omega)$ is plotted on the Y-axis). In some examples, the impedance $Z(\omega)$ may be used to produce a Bode Plot (e.g., log frequency on the X-axis and both the absolute values of the impedance ($|Z|=Z_0$) and the phase-shift on the Y-axis). In some examples, modulus, admittance, and capacitance may be used to represent the current response and/or transformations thereof. In examples in which the electrochemical process is dependent on diffusion of the respective analyte, the impedance may have a low-frequency character, which may be modeled as a Warburg impedance element. In some examples, an equivalent circuit model, e.g., a Randles circuit model, may be used to process the measure current response to determine the impedance the electrochemical system. In some examples, the double layer of the electrochemical system may be modeled as an imperfect parallel plate capacitor (or a constant phase element), such that the concentration of the analyte may be associated with the determined impedance. In this way, the EIS may be used to determine a concentration of the analyte in the sample fluid. By using EIS to determine impedance of the electrochemical system, the respective analyte may be directly measured in the sample fluid (e.g., EIS may be label free), the excitation frequency may be selected to target a respective analyte, the analyte may not be consumed by a reaction, noise may be measured simultaneously to the response signal to improve the signal-to-noise ratio and evaluate the function of the sensor, and power consumption is reduces compared to other detection methods.

In some examples, a diffusion control layer may include one or more metal-organic frameworks configured to control the diffusion of a selected analyte. As illustrated in FIG. 3, diffusion control layer 45C may include a metal-organic framework disposed over reagent substrate 47C. The metal-organic framework may define a lattice structure. In some examples, in response to exposure to a stimulus, such as thermal energy, electrical energy, radiation, or a material, a configuration of the lattice structure of the metal-organic framework may change. For example, the lattice structure may have a first configuration and, in response to the stimulus, change to a second configuration. In some examples, the metal-organic framework may define more than two configurations in response to different stimuli. In some examples, a selected configuration of the lattice structure of the metal-organic framework may be permeable to the selected analyte. In this way, diffusion of the respective analyte may be controlled based on a stimulus applied to the metal-organic framework. In some examples, the metal-organic framework may be produced by combing metal ions with organic linkers. In some examples, the metal ions may include Cobalt (II). In some examples, the organic linkers may include Hexaaminobenzene (HAB). The metal ions and the organic linkers may be selected based on the selected analyte. For example, quinone-based metal-organic frameworks could also be utilized for redox based proteins, such as Oxireductases.

In some examples, a diffusion control layer may include a self-assembled monolayer (SAM) configured to separate a respective analyte. A self-assembled monolayer is a self-organize layer of typically amphiphilic molecules in which one end of the molecule shows a specific affinity for a reagent substrate. SAM molecules may include a head group that anchors the molecule to the reagent substrate and a tile or functional group at the terminal end. In some examples, the SAM layer may be formed chemisorption of head groups onto the reagent substrate. As illustrated in FIG. 3, diffusion control layer 45D may include a self-assembled monolayer disposed over reagent substrate 47D. In some examples, the self-assembled monolayer may include thiol head which can adhere to gold or platinum, carbon chain with an amine or carboxyl tail which can covalently bind to an enzyme/analyte target, or combinations thereof. The composition of the self-assembled monolayer may be selected based on the selected analyte. For example, glucose oxidase can be covalently bound using primary amines with may suggest the use of 16-mercaptohexadecanoic acid (MHDA) and carbodiimide (EDC)/N-hydroxysuccinimide (NSH) complex. Other examples for EIS to detect several biomarkers in diagnosis and management cardiovascular disease (CVD), the entire panel of CVD biomarkers on demand and chronic kidney disease (CKD) such biomarker as neutrophil gelatinase associated lipocalin (NGAL).

In some examples, a diffusion control layer may include one or more pharmaceuticals configured to inhibit binding of a respective analyte to a reagent substrate. As illustrated in FIG. 3, diffusion control layer 45E may include a pharmaceutical disposed over reagent substrate 47E. In some examples, the pharmaceutical may include dexamethasone, NO, minocycline, rifampin, or combinations thereof. The composition of the pharmaceutical may be selected based on the selected analyte. In one of the examples, the composition of the pharmaceutical may be dexamethasone.

Figure 4:
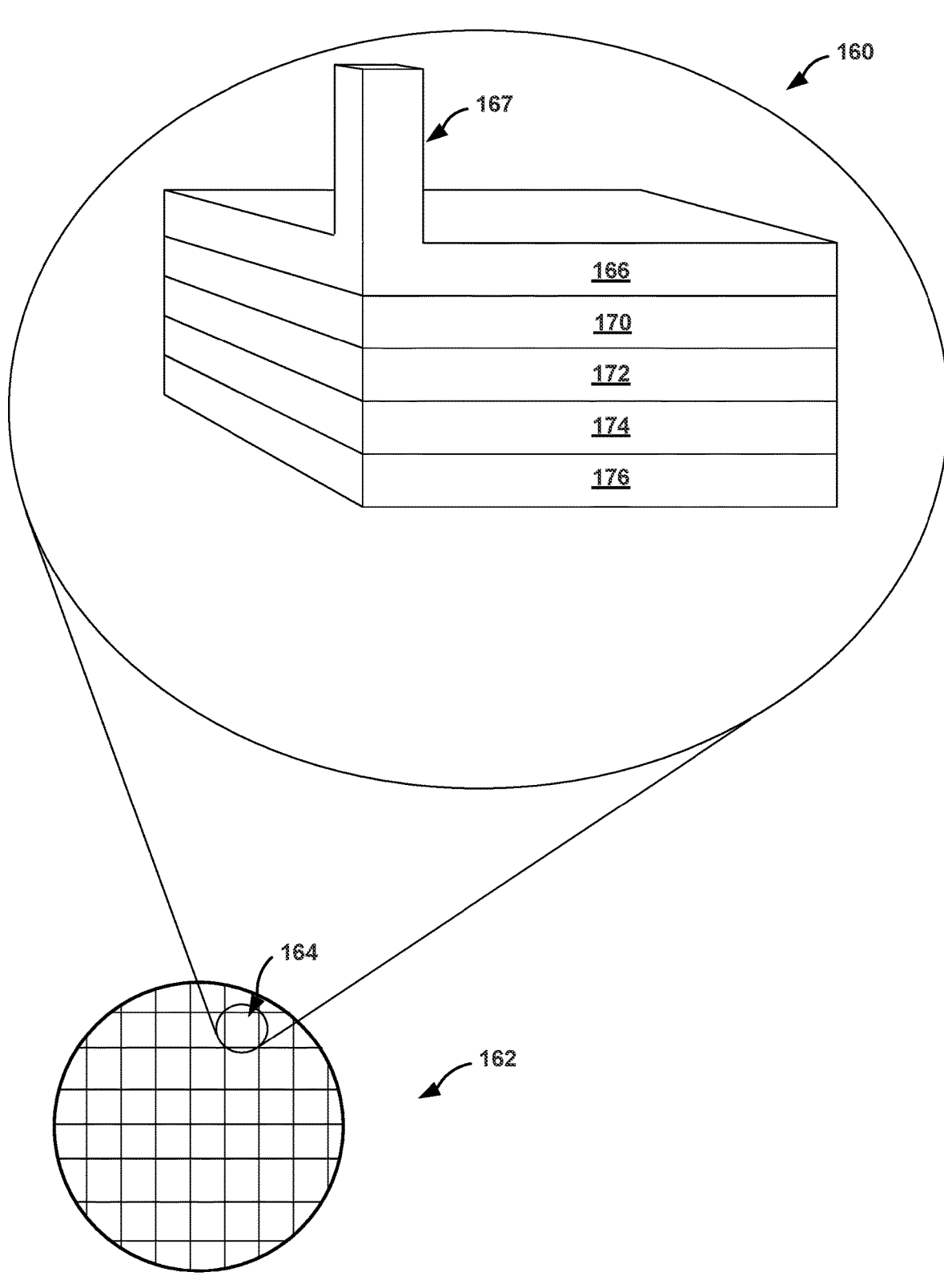
FIG. 4 is a schematic and conceptual diagram illustrating a perspective view of an example medical device including an electrochemical sensor, processing circuitry, an antenna, and a power source.

In some examples, wafer-scale manufacturing techniques, such as semiconductor manufacturing techniques, may be used to form a wafer-scale medical device having a plurality of functional layers that include an electrochemical sensor, processing circuitry, a power source, and an antenna. FIG. 4 is a schematic and conceptual diagram illustrating a perspective view of an example wafer-scale medical device 160 including electrochemical sensor layer 166, circuitry layers 170 and 172, a power source layer 174, and an antenna layer 176.

In some examples, electrochemical sensor layer 166 may define protrusion 167 configured to be transcutaneously insertable into a biological system. For example, protrusion 167 may be inserted in the skin of a patient. In some examples, protrusion 167 may include electrochemical sensor layer 166. In some examples, protrusion 167 may extend between about 2 millimeters and about 20 millimeters, such as 8 millimeters, from a surface wafer-scale device 160. In some examples, wafer-scale device 160 may be fabricated to allow the desired length of protrusion 167 to extend from a surface of wafer-scale device 160. By protrusion 167 extending form a surface of wafer-scale device 160, electrochemical sensor layer 166 may be fluidly coupled to a biological system, such as the interstitial fluid of a patient.

In some examples, wafer-scale technology may be utilized to build a large number of wafer-scale medical devices from a substrate, such as semiconductor wafer, defining a foundation wafer 162. As one non-limiting example, up to 184 individual wafer-scale medical devices 164 may be fabricated using one ten-inch semiconductor foundation wafer 162. Foundation wafer 162 may include any suitable thickness, such as between about 0.1 millimeters to about 1.1 millimeters. In some examples, the die size for each individual wafer-scale medical devices 164 may be approximately 10.5 millimeters by 10.5 millimeters square. Of course, any suitable diameter and thickness for the substrate can be utilized, and the size of each die location can be selected to accommodate the needs of the particular example. Each respective wafer-scale medical device 164 is realized as a discrete stack of functional layers (e.g., electrochemical sensor layer 166, circuitry layers 170 and 172, a power source layer 174, and an antenna layer 176), and each stack is coupled to foundation wafer 162. In some examples, a cap or "lid" structure may be fabricated from another substrate, such as another semiconductor wafer. The cap structure may be coupled overlying foundation wafer 162 in a way that creates enclosures for individual wafer-scale medical device 164. Thereafter, the individual wafer-scale medical devices may be cut or otherwise separated into discrete wafer-scale medical devices (e.g., wafer-scale medical device 164).

Electrochemical sensor layer 166 may be the same as or substantially similar to one or more of electrochemical sensor 10 describe in reference to FIGS. 1A and 1B, electrochemical sensor 40 described in reference to FIG. 2, and/or electrochemical sensor 50 described in reference to FIG. 3. Circuitry layers 170 and 172 may include processing circuitry, communication circuitry, and data storage components operatively coupled to electrochemical sensor layer 166 to receive from electrochemical sensor layer 166 a plurality of signals from a plurality of respective work electrodes. In some examples, circuitry layers 170 and 172 may include semiconductor devices, such as integrated chips manufactures and interconnected on a silicon substrate. In some examples, at least a portion of circuitry layer 170 may be formed on at least a portion of electrochemical sensor layer 166. In some examples, at least a portion of circuitry layer 172 may be formed on at least a portion of circuitry layer 170.

Power source layer 174 may include a solid-state battery, a lithium ion battery, a lithium ion micro battery, a fuel cell, or the like. In some examples, power source layer 174 may be formed on at least one of circuitry layer 172.

In some examples, antenna layer 176 may include a substrate and an antenna formed in the substrate. For example, the substrate may include a biocompatible polymer, such as polyamide or polyimide, silica glass, or silicon. At least a portion of the substrate may be metallized to form the antenna.

By stacking each of electrochemical sensor layer 166, circuitry layers 170 and 172, a power source layer 174, and an antenna layer 176, the size of wafer-scale medical device 160 may be reduced. By forming one or more layers on adjacent layers, manufacturing of wafer-scale medical device 160 may be simplified. By manufacturing wafer-scale medical device 160 using semiconductor manufacturing techniques, a plurality of wafer-scale medical devices 160 may be manufactured simultaneously to reduce manufacturing cost and reduce material waste.

Figure 5:
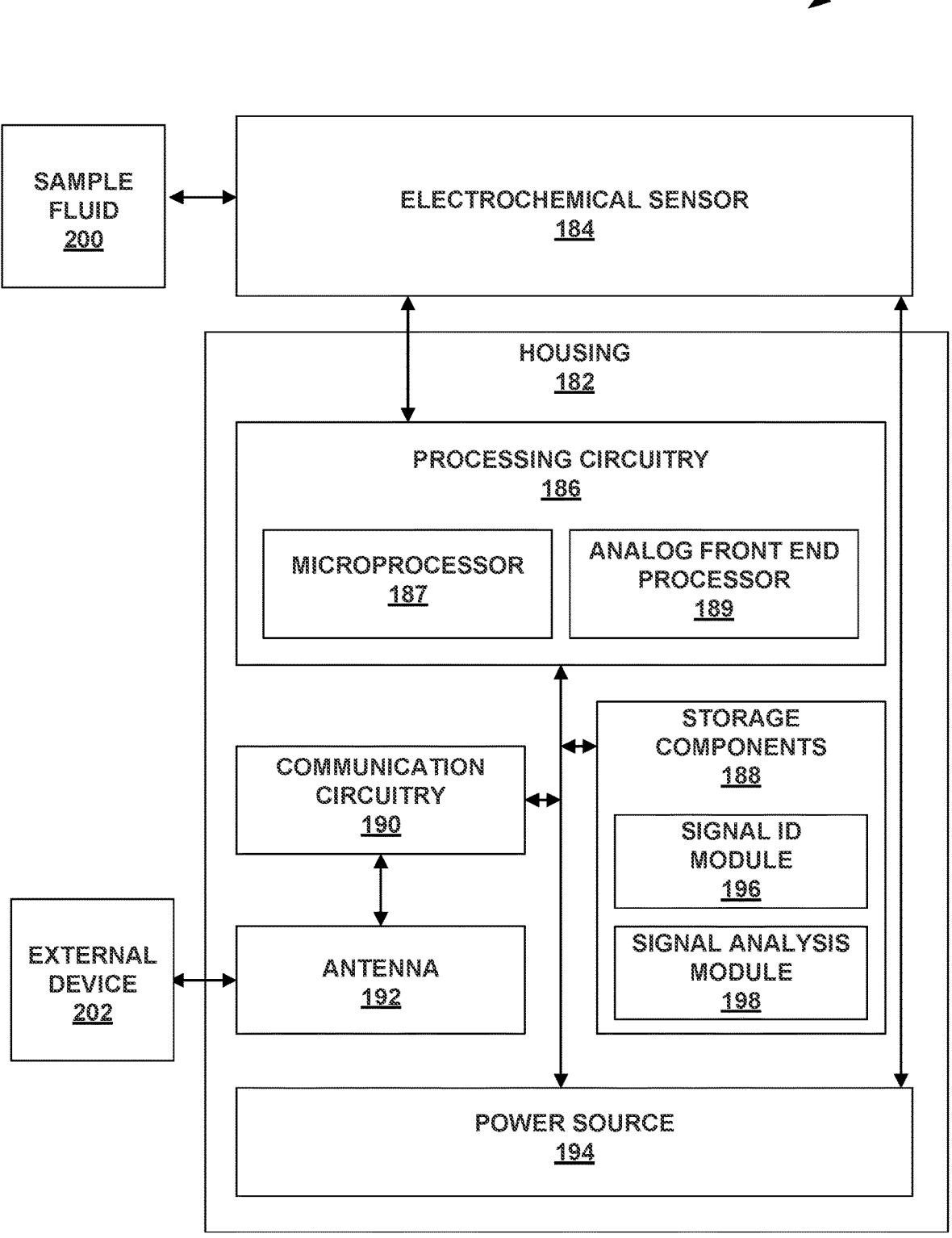
FIG. 5 is a schematic and conceptual block diagram illustrating an example medical device configured to be inserted into the interstitial fluid of a patient.

In some examples, an electrochemical sensor may be used in a medical device configured to be inserted within a patient, such as into the interstitial fluid of the patient. FIG. 5 is a schematic and conceptual block diagram illustrating an example medical device 180 configured to be inserted into the interstitial fluid of a patient. Medical device 180 may include a housing 182, an electrochemical sensor 184, processing circuitry 186, storage components 188, communication circuitry 190, an antenna 192, and a power source 194.

In some examples, at least a portion of a dielectric substrate (e.g., dielectric substrate 20) of the components of medical device 180 may define housing 102. For example, in reference to FIG. 4, exterior edges of layers 166, 170, 172, 174, and 176 may define housing 102. In other examples, housing 102 may include a discrete material layer, for example, including but not limited to, a biocompatible coating, biocompatible casing, molded or 3-D printed plastics. Housing 182 may separate at least a portion of the components of medical device 180 including electrochemical sensor 184, processing circuitry 186, storage components 188, communication circuitry 190, an antenna 192, and a power source 194 from the environment surrounding medical device 180, e.g., sample fluid 200. In some examples, one or more components of medical device 180 may be disposed outside housing 182, such as, for example, affixed to an external surface of housing 182. For example, antenna 188 may be affixed to an external surface of housing 182 to improve transmission properties of antenna 192. Housing 182 may include any suitable shape, such as rectilinear or curvilinear. In some examples, housing 182 may be shaped to facilitate insertion of housing 182 into the interstitial fluid of a human patient. For example, housing 182 may include a circular shape to be loaded into an insertion tool or include rounded corners and edges to reduce irritation to the patient.

Housing 180 may be any suitable dimensions. In some examples, a height of housing 102 may be between approximately 1 millimeter and approximately 7 millimeters, such as approximately 2.35 millimeters. In some examples, a width of housing 182 may be between approximately 5 millimeters and approximately 15 millimeters, such as approximately 10.5 millimeters. In some examples, a length of the housing 182 may be between approximately 5 millimeters and approximately 15 millimeters, such as approximately 10.5 millimeters.

In some examples, at least a portion of electrochemical sensor 184 is fluidly coupled to the environment surrounding medical device 180. For example, at least a portion of a work electrode platform of electrochemical sensor 184 may be fluidly coupled to sample fluid 200. In some examples, housing 182 may include one or more apertures exposing at least a portion of electrochemical sensor 184 to sample fluid 200. In examples in which housing 182 includes a coating or a casing, electrochemical sensor 184 may protrude at least partially through a portion of housing 182. Electrochemical sensor 184 can be the same or substantially similar as described herein.

Processing circuitry 186 may include various type of hardware, including, but not limited to, microprocessors, controllers, digital signal processors (DSPs), application specific integrated circuits (ASICs), field-programmable gate arrays (FPGAs), or equivalent discrete or integrated logic circuitry, as well as combinations of such components. The term "processing circuitry" may generally refer to any of the foregoing logic circuitry, alone or in combination with other logic circuitry, or any other equivalent circuitry. In some examples, processing circuitry 186 may represent and/or include additional components, such as sine wave generator, multiplier, integrators, current-to-voltage converter, current-to-frequency converter, or the like. Processing circuitry 186 represents hardware that can be configured to implement firmware and/or software that sets forth one or more of the algorithms described herein. For example, processing circuitry 186 may be configured to implement functionality, process instructions, or both for execution of processing instructions stored within one or more storage components 188, such as signal identification (ID) module 196 and/or signal analysis module 198.

Processing circuitry 186 is operatively coupled to electrochemical sensor 184 to receive from electrochemical sensor 184. Processing circuitry 186, e.g., via signal identification module 196, may be configured to identify a respective signal corresponding to a respective selected work electrode. For example, processing circuitry 186, e.g., via signal identification module 196, may include a multiplexer to identify a respective signal.

Processing circuitry, e.g., via signal analysis module 198, may be configured to process the identified signal to determine the concentration of the respective analyte associated with the respective selected work electrode, as discussed above, by amperometry, potentiometry, and/or EIS. In some examples, processing circuitry 186 may include an analog-to-digital converter communicatively coupled to a microprocessor 187. Microprocessor 187 may be configured to process a respective signal (e.g., converted by the analog-to-digital converter) corresponding to a respective selected work electrode to determine the concentration of the respective analyte associated with the respective selected work electrode by amperometry or potentiometry.

Medical device 180 may include communications circuitry 190 operatively coupled to processing circuitry 186 and configured to send and receive signals to enable communication with an external device 202 via antenna 192. For example, communications circuitry 190 may include a communications interface, such as a radio frequency transmitter and/or receiver, cellular transmitter and/or receiver, a Bluetooth® interface card, or any other type of device that can send information or send and receive information. In some examples, the communications interface of communications circuitry 190 may be configured to send and/or receive data via antenna 192. In some examples, medical device 180 uses communications circuitry 190 to wirelessly transmit (e.g., a one-way communication) data to external device 202. In some examples, external devices 202 may include, but is not limited to, a radio frequency identification reader, a mobile device, such as a cell phone or tablet, or a computing device operatively coupled to an electronic medical records database or remote server system. In this way, antenna 112 may be operatively coupled to the processing circuitry and configured to transmit data representative of the concentration of the respective analyte to external device 112.

In some examples, processing circuitry 186 may cause communication circuitry 190 to transmit, via antenna 192, data indicative of a determined concentration of an analyte, such as processed data, unprocessed signals from electrochemical sensor 184, or both. In some examples, external device 202 may continuously or periodically interrogate or poll communications circuitry 190 via antenna 192 to cause processing circuitry 186 to receive, identify, or process signals from electrochemical sensor 184. By receiving, identifying, or processing signals from electrochemical sensor 184 only when interrogated or polled by external device 202, processing circuitry may conserve power or processing resources. Wireless Tissue Conductivity Communication which can connected multiple or mesh device together or communicate through the body/skin. Another method of communication can be acoustic.

One or more storage components 188 may be configured to store information within medical device 180. One or more storage components 188, in some examples, include a computer-readable storage medium or computer-readable storage device. In some examples, one or more storage components 188 include a temporary memory, meaning that a primary purpose of one or more storage components 188 is not long-term storage. One or more storage components 188, in some examples, include a volatile memory, meaning that one or more storage components 188 does not maintain stored contents when power is not provided to one or more storage components 188. Examples of volatile memories include random access memories (RAM), dynamic random-access memories (DRAM), static random-access memories (SRAM), and other forms of volatile memories known in the art. In some examples, one or more storage components 188 are used to store program instructions for execution by processing circuitry 186. One or more storage components 188, in some examples, are used by software or applications running on processing circuitry 186 to temporarily store information during program execution.

In some examples, one or more storage components 188 may further include one or more storage components 188 configured for longer-term storage of information. In some examples, one or more storage components 188 include non-volatile storage elements. Examples of such non-volatile storage elements include flash memories, or forms of electrically programmable memories (EPROM) or electrically erasable and programmable (EEPROM) memories.

As noted above, storage components 188 may store signal identification module 196 and signal analysis module 198. Each of signal identification module 196 and signal analysis module 198 may be implemented in various ways. For example, one or more of signal identification module 196 and signal analysis module 198 may be implemented as an application or a part of an application executed by processing circuitry 186. In some examples, one or more of signal identification module 196 and signal analysis module 198 may be implemented as part of a hardware unit of medical device 180 (e.g., as circuitry). In some examples, one or more of sig signal identification module 196 and signal analysis module 198 may be implemented remotely on external device 202 as part of an application executed by one or more processors of external device 202 or as a hardware unit of external device 202.

Power source 194 may be operatively coupled to processing circuitry 186, storage components 188, and/or communication circuitry 190. In some examples, power source 194 may be operatively coupled to electrochemical sensor 184, for example, to supply a working potential or working current to a respective work electrode of the plurality of respective work electrodes. Power source 194 may include any suitable power source, such as, for example, solid state battery, a lithium ion battery, a lithium ion micro battery, a fuel cell, or the like.

Figure 6:
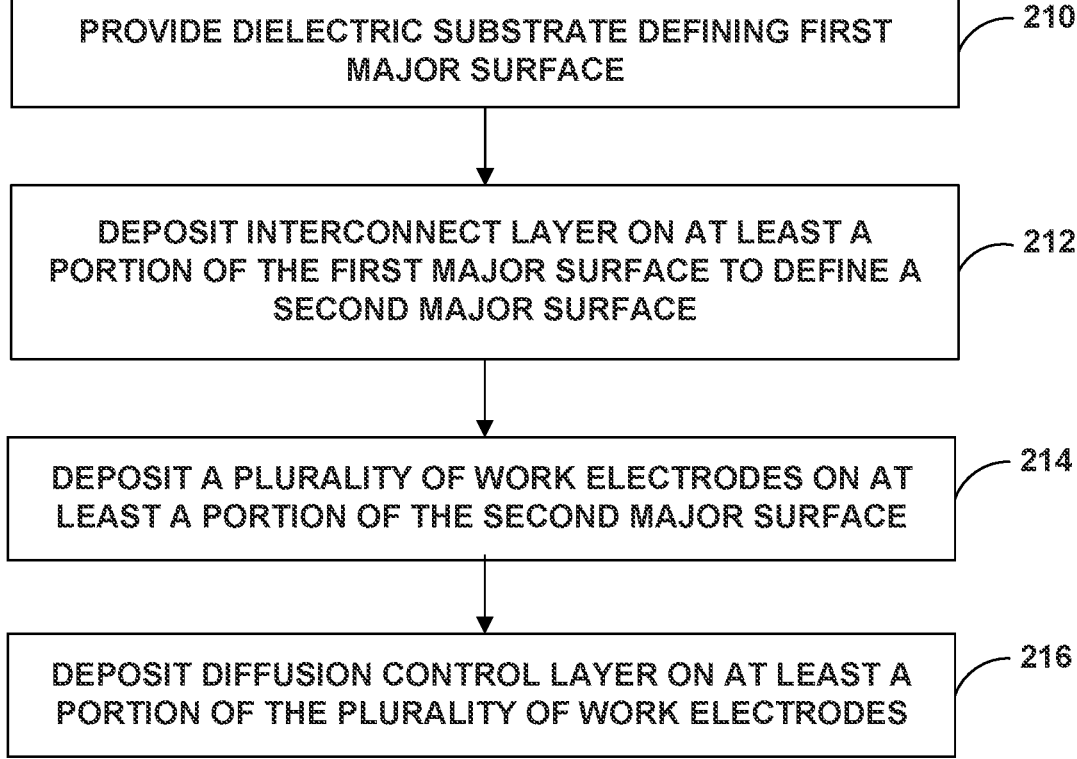
FIG. 6 is a flow diagram illustrating an example technique of forming an electrochemical sensor including a work platform having a plurality of respective work electrodes.

The medical devices and electrochemical sensors described herein by be formed using any suitable technique. In some examples, the medical devices and electrochemical sensors may be formed using techniques described in U.S. patent application Ser. No. 16/116,306 entitled "Electrochemical Sensor Including Multiple Work Electrodes and Common Reference Electrode". FIG. 6 is a flow diagram illustrating an example technique of forming an electrochemical sensor. Although the technique illustrated in FIG. 6 will be described with respect to electrochemical sensor 10 of FIGS. 1A and 1B, in some examples, the technique illustrated in FIG. 6 may be used to form other electrochemical sensors, including, but not limited to, electrochemical sensor 40 illustrated in FIG. 2, electrochemical sensor 50 illustrated in FIG. 3, electrochemical sensor layer 166 illustrated in FIG. 4, and/or electrochemical sensor layer 184 illustrated in FIG. 5.

The technique illustrated in FIG. 6 includes providing dielectric substrate 20 defining first major surface 24 (210). In some examples, providing dielectric substrate 20 may include forming surface features in dielectric substrate 20, such as, for example, dielectric barriers 98, by, for example, machining, laser etching, or chemical etching. In some examples, providing dielectric substrate 20 may include providing a wafer including a plurality of regions, each region defining dielectric substrate 20. For example, a wafer may include approximately 184 regions. By using a wafer, a plurality of electrochemical sensors 10 may be manufactured substantially simultaneously.

The technique illustrated in FIG. 6 also includes depositing interconnect layer 22 on at least a portion of first major surface 24 to define second major surface 26 opposite first major surface 24 (212). In some examples, depositing interconnect layer 22 may include metallizing first major surface 24 by, for example, chemical vapor deposition, physical vapor deposition, sputtering, thermal spraying, cold spraying, or the like. In some examples, depositing interconnect layer 22 may include polishing at least a portion of second major surface 26 or etching at least a portion of second major surface 26 to define discrete electrical interconnects. Second major surface 26 may provide a suitable surface for subsequent deposition of work electrodes 18, counter electrode 12, and/or common reference electrode 14.

The technique illustrated in FIG. 6 also includes depositing work electrodes 18 on at least a portion of second major surface 26 (214). In some examples, each respective work electrode of work electrodes 18 may include a respective reagent substrate (e.g., reagent substrates 28) configured to react with a respective analyte to produce a signal indicative of a concentration of the respective analyte. By depositing work electrodes 18 on at least a portion of second major surface 26, each respective work electrode of work electrodes 18 may be configured to conduct a signal indicative of a concentration of the respective analyte to interconnect layer 22.

In some examples, depositing the plurality of respective work electrodes may include positioning a mask on at least a portion of second major surface 26 to define an unmasked area of second major surface 26. In some examples, the mask may include any suitable material configured to releasably adhere to second major surface, such as, for example, a photoresist. Depositing the plurality of respective work electrodes may also include depositing a reagent substrate layer (e.g., reagent substrates 28) on the unmasked area. In some examples, depositing the reagent substrate layer may include a preparation of the unmasked area, such as, for example, exposure to a chemical etchant or selected wavelength of radiation. Depositing the plurality of respective work electrodes may also include removing the mask, for example, by a mask stripper. Depositing the plurality of respective work electrodes may also include depositing a membrane layer on at least a portion of the reagent substrate layer. In some examples, the membrane layer may include a limiting membrane or a selective ion transfer membrane, as discussed above. In this way, depositing the plurality of respective work electrodes may include forming a respective work electrode of work electrodes 18 having a reagent substrate and a membrane, as discussed above.

In some examples, depositing the plurality of respective work electrodes may include depositing a second mask on second major surface 26, the reagent substrate layer, and/or the membrane layer to define a second unmasked area. In some examples, the second mask may include any suitable material configured to releasably adhere to second major surface 26, the reagent substrate layer, and/or the membrane layer, such as, for example, a photoresist. Depositing the plurality of respective work electrodes may also include depositing a second membrane layer on the second unmasked area. In some examples, depositing the second membrane layer may include a preparation of the second unmasked area, such as, for example, exposure to a chemical etchant or selected wavelength of radiation. Depositing the plurality of respective work electrodes may also include removing the second mask, for example, by a mask stripper. In some examples, the second membrane layer may include a limiting membrane or a selective ion transfer membrane, as discussed above. In this way, depositing the plurality of respective work electrodes may include forming a respective work electrode of work electrodes 18 having a reagent substrate and a plurality of membranes, as discussed above.

The technique illustrated in FIG. 6 optionally includes depositing common reference electrode 14 on at least a portion of second major surface 26 and depositing counter electrode 12 on at least a portion of second major surface 26. In this way, work electrodes 18 may be operatively coupled to common reference electrode 14 and counter electrode 12.

The technique illustrated in FIG. 6 includes depositing one or more diffusion control layers 36 on work electrodes 18 (216). As described above, diffusion control layers 36 may include, for example, one or more dissolvable diffusion control layers, one or more enzyme-driven membranes, one or more permeable membranes, layered reagent substrates, one or more metal-organic frameworks, self-assembled monolayer, one or more pharmaceuticals, or combinations thereof. Diffusion control layers 36 may be deposited using any suitable technique, such as slot coating, spin coating, spray coat, dip coat, ink jet, or combinations thereof.

In examples in which diffusion control layers 36 include a dissolvable diffusion control layer, depositing one or more diffusion control layers 36 may include depositing any one or more of carbon, carbon nanotubes, graphite, zinc, magnesium, natural hydrogels, synthetic hydrogels, or combinations thereof. The natural hydrogels may include one or more of collagen, gelatin, chitosan, agar, agarose, and fibrin. The synthetic hydrogels may include one or more of polyethylene glycol (PEG), polyethylene oxide (PEO), polyvinyl alcohol (PVA), propylene fumarate (PPF), and aldehyde guluronate groups.

In examples in which diffusion control layers 36 include an enzyme-driven membrane, depositing one or more diffusion control layers 36 may include depositing an enzyme on work electrodes 18 using, for example, slot coating, spin coating, spray coat, dip coat, ink jet, or combinations thereof. In some examples, an optional binding material may be deposited on work electrodes 18. The optional binding material may be selected to chemically bind to both a material of work electrodes 18 and at least a portion of the enzyme. In some examples, depositing an enzyme may include depositing a hydrogel on work electrodes 18. In some examples, depositing an enzyme may include depositing one or more additives with the enzyme.

In examples in which diffusion control layers 36 include a permeable membrane, depositing one or more diffusion control layers 36 may include depositing an impermeable material on work electrodes 18 and forming, e.g., by drilling or etching, a plurality of pores in the impermeable material. Additionally or alternatively, depositing one or more diffusion control layers 36 may include depositing an permeable material on work electrodes 18.

In examples in which diffusion control layers 36 include layered reagent substrates, depositing one or more diffusion control layers 36 may include depositing two or more reagent substrates, for example, as described above.

In examples in which diffusion control layers 36 include a metal-organic framework, depositing one or more diffusion control layers 36 may include forming a metal-organic framework on work electrode 18. For example, forming the metal-organic framework may include application of solution containing a metal ion or metal ion cluster and an organic ligand to work electrodes 18 and growing a crystal defining the metal-organic framework by, for example, cooling the solution.

In examples in which diffusion control layers 36 include a self-assembled monolayer, depositing one or more diffusion control layers 36 may include forming a self-assembled monolayer on work electrode 18. For example, forming the self-assembled monolayer may include application of solution containing organic molecule configured to spontaneously adsorb to work electrode 18.

In examples in which diffusion control layers 36 include a pharmaceutical, depositing one or more diffusion control layers 36 may include a pharmaceutical on work electrode 18 using, for example, slot coating, spin coating, spray coat, dip coat, ink jet, or combinations thereof. In some examples, an optional binding material may be deposited on work electrodes 18. The optional binding material may be selected to chemically bind to both a material of work electrodes 18 and at least a portion of the pharmaceutical.

The following clauses include example subject matter of the present disclosure.

Clause 1. An electrochemical sensor comprising: a common reference electrode; at least one counter electrode; and a work electrode platform comprising a work electrode and at least one diffusion control layer, wherein the work electrode is electrically coupled to the common reference electrode, wherein the work electrode comprises a reagent substrate configured to react with an analyte to produce a signal indicative of a concentration of the analyte, and wherein the at least one diffusion control layer is configured to control the diffusion of the analyte to the work electrode.

Clause 2. The electrochemical sensor of Clause 1, wherein the work electrode is a first work electrode, the reagent substrate is a first reagent substrate, and the analyte is a first analyte, wherein the work electrode platform further comprises a second work electrode disposed adjacent to the first work electrode, wherein the second work electrode comprises a second reagent substrate configured to react with a second analyte to produce a second signal indicative of the concentration of the second analyte, wherein the at least one diffusion control layer comprises: a first dissolvable diffusion control layer having a first area configured to cover the first work electrode and the second work electrode; and a second dissolvable diffusion control layer having a second area configured to cover the second work electrode and not to cover the first work electrode.

Clause 3. The electrochemical sensor of Clause 2, wherein the second dissolvable diffusion control layer is configured to expose the first work electrode and not to expose the second work electrode at a first point in time, wherein the second dissolvable diffusion control layer is further configured to expose both the first work electrode and the second work electrode at a second point in time.

Clause 4. The electrochemical sensor of Clause 2 or 3, wherein the first dissolvable diffusion control layer and the second dissolvable diffusion control layer include at least one of carbon, carbon nanotubes, graphite, zinc, magnesium, natural hydrogels, or synthetic hydrogels, wherein the natural hydrogels include one or more of collagen, gelatin, chitosan, agar, agarose, and fibrin, wherein the synthetic hydrogels include one or more of polyethylene glycol (PEG), polyethylene oxide (PEO), polyvinyl alcohol (PVA), propylene fumarate (PPF), and aldehyde guluronate groups.

Clause 5. The electrochemical sensor of Clause 1, wherein the least one diffusion control layer comprises a first diffusion control layer and a second diffusion control layer, wherein the work electrode comprises a first reagent substrate layer and a second reagent substrate layer, wherein the first diffusion control layer is disposed on the first reagent substrate layer, wherein a second reagent substrate layer is disposed on the first diffusion control layer, and wherein the second diffusion control layer disposed on the second reagent substrate layer.

Clause 6. The electrochemical sensor of Clause 5, wherein the first reagent substrate is configured to react with a first analyte to produce a first signal indicative of a concentration of the first analyte, wherein the second reagent substrate is different than the first reagent substrate and is configured to react with a second analyte different from the first analyte to produce a second signal indicative of a concentration of the second analyte.

Clause 7. The electrochemical sensor of Clause 6, wherein the first diffusion control layer comprises a first enzyme-driven membrane having a first additive configured control the diffusion of the first analyte, and wherein the second diffusion control layer comprises a second enzyme-driven membrane having a second additive different from the first additive configured to control the diffusion of the second analyte.

Clause 8. The electrochemical sensor of Clause 7, wherein the first additive and the second additive include at least one of dexamethasone or nitric oxide.

Clause 9. The electrochemical sensor of any one of Clauses 6 to 8, wherein the first diffusion control layer comprises a first permeable membrane defining first pores having a first average diameter, and wherein the second diffusion control layer comprises a second permeable membrane defining second pores having a second average diameter larger than the first average diameter.

Clause 10. The electrochemical sensor of Clause 9, wherein the average diameter of the first pores is 5 angstroms to 200 angstroms, wherein the average diameter of the second pores is 5 angstroms to 200 angstroms.

Clause 11. The electrochemical sensor of Clause 1, wherein the work electrode comprises a first reagent substrate configured to react with a first analyte at a first potential applied to the first reagent substrate to produce a first signal indicative of a concentration of the first analyte, and wherein the at least one diffusion control layer comprises a second reagent substrate configured to react with a second analyte at a second potential applied to the second reagent substrate to produce a second signal indicative of a concentration of the second analyte.

Clause 12. The electrochemical sensor of Clause 1, wherein the work electrode comprises a first reagent substrate configured to exhibit a first impedance in response to a first potential in presence of a first analyte to produce a first current frequency, and wherein the at least one diffusion control layer comprises a second reagent substrate configured to exhibit a second impedance in response to a second potential in presence of a second analyte to produce a second current frequency.

Clause 13. The electrochemical sensor of Clause 1, wherein the at least one diffusion control layer includes one or more metal-organic frameworks, wherein the one or more metal-organic frameworks are disposed over the reagent substrate, and wherein at least one of the one or more metal-organic frameworks includes a lattice structure configured to separate the analyte from a fluid in response to the application of an energy, a current, or a material to the one or more metal-organic frameworks.

Clause 14. The electrochemical sensor of Clause 13, wherein the lattice structure defines plurality of apertures having a size or a shape of the analyte.

Clause 15. The electrochemical sensor of Clause 1, wherein the at least one diffusion control layer includes a self-assembled monolayer, and wherein the self-assembled monolayer is disposed over the reagent substrate and configured to separate the respective analyte from a fluid.

Clause 16. The electrochemical sensor of Clause 15, wherein the self-assembled monolayer comprises 16-mer-captohexadecanoic acid (MHDA) and carbodiimide (EDC)/N-hydroxysuccinimide (NSH) complex.

Clause 17. The electrochemical sensor of Clause 1, wherein the at least one diffusion control layer includes one or more pharmaceuticals, wherein the one or more pharmaceuticals are disposed over the reagent substrate, and wherein the pharmaceutical is configured to inhibit binding of the analyte to the reagent substrate.

Clause 18. The electrochemical sensor of Clause 17, wherein the one or more pharmaceuticals comprises dexamethasone.

Clause 19. A method of forming an electrochemical sensor, the method comprising: forming a common reference electrode; forming at least one counter electrode; and forming a work electrode platform comprising a work electrode and at least one diffusion control layer, wherein the work electrode is electrically coupled to the common reference electrode, wherein the work electrode comprises a reagent substrate configured to react with an analyte to produce a signal indicative of a concentration of the analyte, and wherein the at least one diffusion control layer is configured to control the diffusion of the analyte to the work electrode.

Clause 20. The method of Clause 19, wherein the work electrode platform comprises the work electrode platform of any of Clause 1 through 18.

Various examples have been described. These and other examples are within the scope of the following claims.

What is claimed is:

1. An electrochemical sensor comprising:
a common reference electrode;
at least one counter electrode; and
a work electrode platform comprising a first work electrode disposed on a first portion of a surface, a second work electrode laterally neighboring and in contact with the first work electrode and disposed on a second portion of the surface contiguous to the first portion of the surface, and at least one diffusion control layer coextensive to a pair of opposed ends of the first work electrode and the second work electrode, the at least one diffusion control layer comprising a matrix material defining a plurality of pores,
wherein the second work electrode is electrically coupled to the common reference electrode, wherein the first work electrode comprises a first reagent substrate configured to react with a first analyte to produce a first signal indicative of a concentration of the first analyte, wherein the second work electrode comprises a second reagent substrate configured to react with a second analyte to produce a second signal indicative of a concentration of the second analyte, wherein the at least one diffusion control layer is configured to control diffusion of the first analyte through the plurality of pores of the at least one diffusion control layer to the first work electrode and diffusion of the second analyte through the plurality of pores of the at least one diffusion control layer to the second work electrode, and wherein the at least one diffusion control layer comprises at least two dissolvable diffusion control layers being laterally adjacent to each other, the at least two dissolvable diffusion control layers comprising a first dissolvable diffusion control layer covering a surface of the first reagent substrate and a second dissolvable diffusion control layer covering a surface of the second reagent substrate.

2. The electrochemical sensor of claim 1, wherein the first dissolvable diffusion control layer comprises a first enzyme-driven membrane having a first additive configured to control the diffusion of the first analyte, and wherein the second dissolvable diffusion control layer comprises a second enzyme-driven membrane having a second additive different from the first additive configured to control the diffusion of the second analyte.

3. The electrochemical sensor of claim 2, wherein the first additive or the second additive includes at least one of dexamethasone or nitric oxide.

4. The electrochemical sensor of claim 1, wherein the first dissolvable diffusion control layer comprises a first permeable membrane defining first pores having a first average diameter, and wherein the second dissolvable diffusion control layer comprises a second permeable membrane defining second pores having a second average diameter larger than the first average diameter.

5. The electrochemical sensor of claim 4, wherein the first average diameter of the first pores is 5 angstroms to 200 angstroms, wherein the second average diameter of the second pores is 5 angstroms to 200 angstroms.

6. The electrochemical sensor of claim 1, wherein the first reagent substrate is configured to react with the first analyte at a first potential applied to the first reagent substrate to produce the first signal indicative of the concentration of the first analyte, and wherein the second reagent substrate is configured to react with the second analyte at a second potential applied to the second reagent substrate to produce the second signal indicative of the concentration of the second analyte.

7. The electrochemical sensor of claim 1, wherein the first reagent substrate is configured to exhibit a first impedance in response to a first potential in presence of the first analyte to produce a first current frequency, and wherein the second reagent substrate is configured to exhibit a second impedance in response to a second potential in presence of the second analyte to produce a second current frequency.

8. The electrochemical sensor of claim 1, wherein the at least one diffusion control layer includes one or more metal-organic frameworks, wherein the one or more metal-organic frameworks are disposed over one or both of the first reagent substrate and the second reagent substrate, and wherein at least one of the one or more metal-organic frameworks includes a lattice structure configured to separate the first analyte or the second analyte from a fluid in response to application of an energy, a current, or a material to the at least one of the one or more metal-organic frameworks.

9. The electrochemical sensor of claim 8, wherein the lattice structure defines a plurality of apertures having a size or a shape of the first analyte or the second analyte.

10. The electrochemical sensor of claim 1, wherein the at least one diffusion control layer includes a self-assembled monolayer, and wherein the self-assembled monolayer is disposed over the first reagent substrate or the second reagent substrate and configured to separate the first analyte or the second analyte from a fluid.

11. The electrochemical sensor of claim 10, wherein the self-assembled monolayer comprises 16-mercaptohexadecanoic acid (MHDA) and carbodiimide (EDC)/N-hydroxysuccinimide (NHS) complex.

12. The electrochemical sensor of claim 1, wherein the at least one diffusion control layer includes one or more pharmaceuticals, wherein the one or more pharmaceuticals are disposed over the first reagent substrate or the second reagent substrate, and wherein the one or more pharmaceuticals are configured to inhibit binding of the first analyte or the second analyte to the first reagent substrate or the second reagent substrate.

13. The electrochemical sensor of claim 12, wherein the one or more pharmaceuticals comprise dexamethasone.

14. The electrochemical sensor of claim 1, wherein the at least one counter electrode has a surface area larger than a surface area of each of the first and second work electrodes.

15. A method of forming an electrochemical sensor, the method comprising:

forming a common reference electrode;

forming at least one counter electrode; and forming a work electrode platform comprising a first work electrode disposed on a first portion of a surface, a second work electrode laterally neighboring and in contact with the first work electrode and disposed on a second portion of the surface contiguous to the first portion of the surface, and at least one diffusion control layer coextensive to a pair of opposing ends of the first work electrode and the second work electrode, the at least one diffusion control layer comprising a matrix material defining a plurality of pores, wherein the second work electrode is electrically coupled to the common reference electrode, wherein the first work electrode comprises a first reagent substrate configured to react with a first analyte to produce a signal indicative of a concentration of the first analyte, wherein the second work electrode comprises a second reagent substrate configured to react with a second analyte to produce a signal indicative of a concentration of the second analyte, wherein the at least one diffusion control layer is configured to control diffusion of the first analyte through the plurality of pores of the at least one diffusion control layer to the first work electrode and diffusion of the second analyte through the plurality of pores of the at least one diffusion control layer to the second work electrode, and wherein the at least one diffusion control layer comprises at least two dissolvable diffusion control layers being laterally adjacent to each other, the at least two dissolvable diffusion control layers comprising a first dissolvable diffusion control layer covering a surface of the first reagent substrate and a second dissolvable diffusion control layer covering a surface of the second reagent substrate.

* * * * *